No. 869,686. PATENTED OCT. 29, 1907.
J. BAUNO.
ADVERTISING TOY.
APPLICATION FILED JULY 8, 1907.
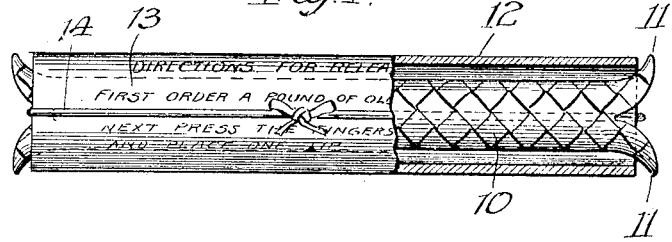
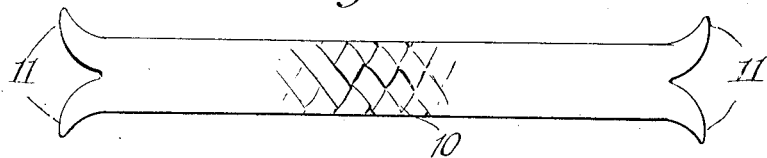
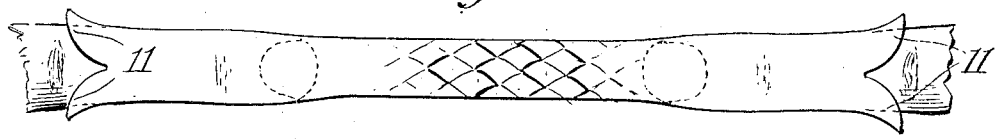
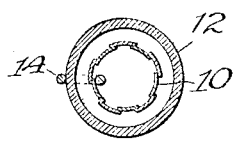
Witnesses
Inventor
Julius Bauno
By

UNITED STATES PATENT OFFICE.

JULIUS BAUNO, OF CHICAGO, ILLINOIS.

ADVERTISING TOY.

No. 869,686.      Specification of Letters Patent.      Patented Oct. 29, 1907.

Application filed July 8, 1907. Serial No. 382,783.

*To all whom it may concern:*

Be it known that I, JULIUS BAUNO, a citizen of the United States, residing at Chicago, in the county of Cook and State of Illinois, have invented certain new and useful Improvements in Advertising Toys, of which the following is a specification.

My invention relates to improvements in advertising toys, and has for its primary object to provide a toy which is simple in construction, cheap and easy of manufacture, adapted to be employed as an advertising device in such manner as to compel the reading of advertisements during the operation of the toy, and, which in use, is amusing and interesting.

To these ends my invention consists in the combinations and arrangement of parts hereinafter more fully described and pointed out in the claims.

In the drawing: Figure 1 is a side elevation, with parts broken away, showing an embodiment of my invention; Fig. 2 is an elevation of the finger trap detached, shown under normal conditions; Fig. 3 illustrates the operation of the finger trap, and; Fig. 4 is a central cross section through Fig. 1.

Throughout the views like numerals of reference refer always to like parts.

In general I provide a finger trap, preferably in the form of a cylindrical structure, constructed of woven willow splints, and of such construction that when extended longitudinally it decreases in diameter; combined with a surrounding stiffening member, of a character to bear advertisement, and preferably retained in association with said stiffening member by means which permit the free rotation of the stiffening member about the trap.

Specifically, 10 indicates in general a finger trap, in the form of a cylindrical structure, made of spirally interwoven or braided strips, of a material relatively strong, flexible and non-elastic, such as thin willow splints or leather strips, such cylindrical structure being woven in the manner shown in Figs. 1 and 2, or other suitable fashion, so that when in normal or longitudinally unexpanded condition it is large enough in diameter to receive a finger, and preferably long enough to permit the introduction of the two fore fingers from opposite ends without meeting in the middle. The braiding of the trap makes it susceptible of longitudinal elongation, but with a consequent decrease in diameter, so that if the fingers be inserted in the opposite ends of the structure and effort be made to draw the fingers apart, the trap structure elongates, as shown in Fig. 3, but, contracting, grasps and firmly holds the fingers, so that it is impossible to extract them by pulling them directly apart. This general idea of such a finger trap is old, and I do not claim it *per se*. As a part of my invention, however, I form the finger trap structure with opposite flaring end lips 11—11, at each end, for purposes which will become apparent.

Surrounding the finger trap 10 I provide a stiffening member, preferably in the form of a cylinder 12, of paper board, such as is commonly employed in mailing tubes, or of like relatively stiff material capable of carrying an advertisement. The particular form and construction of the stiffening member may be widely varied, but the paper cylinder which I have shown is effective and cheap. Upon the surface of the stiffening member 12 may be applied, in any suitable manner, directions for the use of the toy, and in such directions may be incorporated, if desired, advertising matter so arranged as to be necessarily read in reading the directions. Such printed matter is generally indicated at 13.

Preferably the length of the stiffening member relative to the finger trap is such, that under normal conditions the finger trap is substantially covered by the stiffening member save for the end lips 11—11, which preferably protrude somewhat beyond the extremities of the stiffening member.

It will be observed that the protruding lips 11 themselves tend to retain the stiffening member in place, and are a means to this end, but as such lips are preferably flexible I prefer to provide for positive connection of the trap and stiffening member by means that permits free rotation of the stiffening member with respect to the trap, so that when in use the stiffening member may be rotated to permit the reading of all of the directions and advertising matter. To this end I provide a band or string 14 passing axially through the interior of the trap and back over the exterior of the stiffening member. If desired the ends of the bands may be secured inside to the trap member, or as shown, they may be merely tied at any convenient point.

In use the toy may be handed to the uninitiated person with the suggestion that he insert his fore fingers in the ends of the structure and endeavor to make them meet in the center. When this is done and the user endeavors to withdraw his fingers he finds them securely imprisoned and quickly discovers that the willow trap structure is too strong to break and grips only tighter the harder the fingers are pulled endwise. Release, however, may be secured by pressing the opposite fingers inwardly sufficiently to restore the trap to its normal length or slightly less than its normal length, so that the opening may be as large as it was when the fingers were inserted, then placing one of the protruding lips 11 upon the sharp corner of a table, or the like, and pressing down the stiffening member to bite thereupon and hold the trap against following the finger, then the finger may be withdrawn downward and the other finger extracted in like manner.

It will be observed that the stiffening member practically conceals the trap so that the uninitiated user does not suspect its operation, is unable to observe the movements of the strand of the trap as they are put under longitudinal strain or relieved therefrom, and so does not readily get the clue to the releasing operation. Furthermore it prevents the user from doubling the trap over upon itself when in the position shown in Fig. 3, and with the thumb and middle finger of one hand drawing up the end of the trap which holds the fore finger of the other hand to expand the trap and so procure release of the imprisoned finger. And in addition as has been shown, the stiffener is valuable as an advertisement carrier, and also as affording the initiated user a means of securing release of the imprisoned fingers which will not be obvious to the uninitiated.

While I have herein described in detail an embodiment of my invention, it may be apparent that changes may be made therein without departure from the spirit and scope of my invention.

Having thus described my invention, what I claim and desire to secure by Letters Patent of the United States, is:

1. In combination, a finger trap in the form of a cylindrical structure arranged to contract circumferentially when longitudinally expanded, and a stiffening member for preventing transverse bending of said trap.

2. In combination, a finger trap of the character described, and a stiffening member surrounding said trap.

3. In combination, a finger trap of the character described, and a cylindrical stiffening member surrounding said trap.

4. In combination, a finger trap of the character described having flaring end portions and a stiffening member surrounding said trap between said flaring end portions.

5. In combination, a finger trap of the character described having flaring lips 11, and a cylinder 12, surrounding said trap and covering substantially its length between said flaring lips.

6. In combination, a finger trap of the character described, a stiffening member surrounding said finger trap, and means for retaining said stiffening member in its operative association with the finger trap.

7. In combination, a finger trap of the character described, a stiffening member surrounding said finger trap, and means for positively preventing displacement of the stiffening member with respect to the finger trap, arranged to permit relative rotary movement of said stiffening member with respect to the finger trap.

In testimony whereof I hereunto set my hand in the presence of two witnesses.

JULIUS BAUNO.

In the presence of—
  GEO. T. MAY, Jr.,
  MARY F. ALLEN.